2,422,558

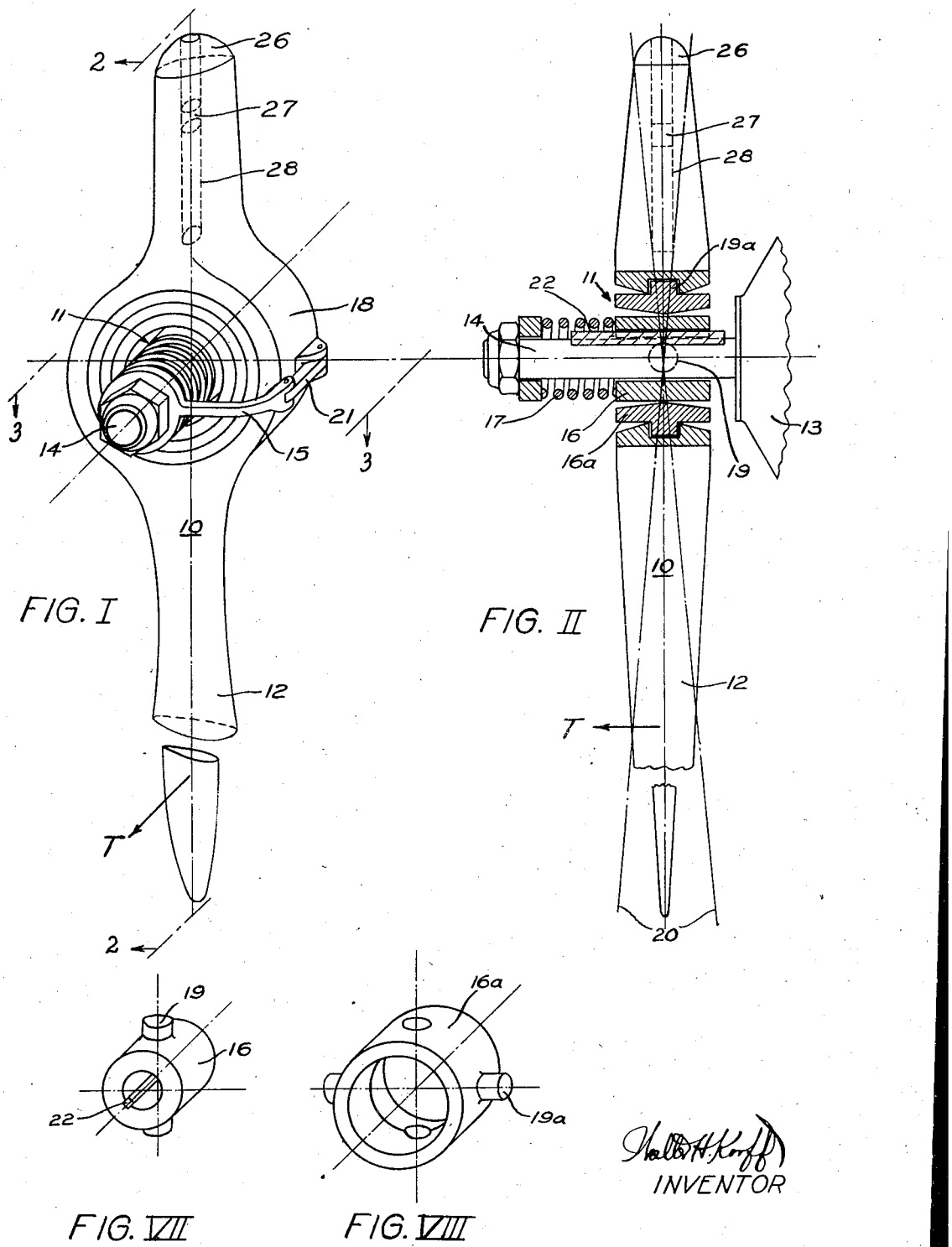

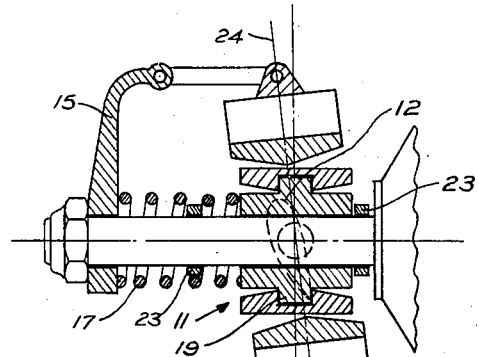
FIG. III
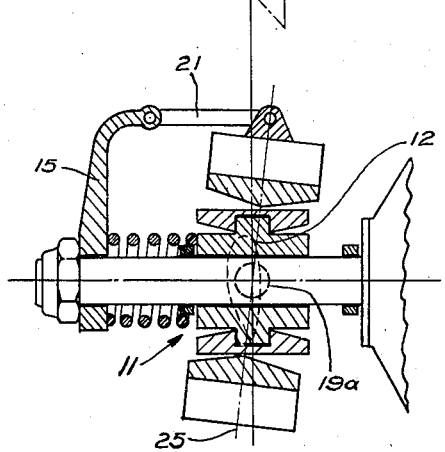
FIG. IV
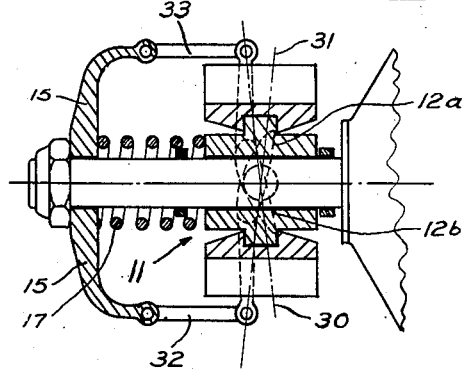
FIG. VI
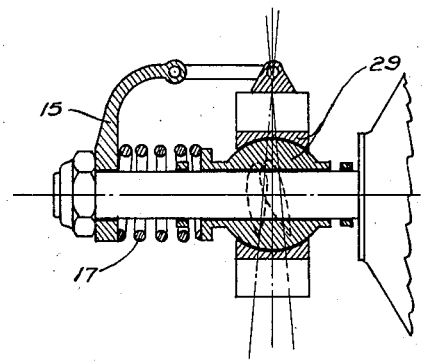
FIG. V
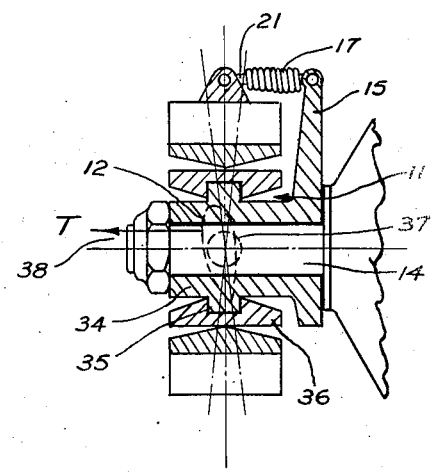
FIG. IX Patented June 17, 1947

UNITED STATES PATENT OFFICE 2,422,558

ADJUSTABLE PITCH PROPELLER

Walter H. Korff, Burbank, Calif.

Application September 15, 1941, Serial No. 410,920

9 Claims. (Cl. 170—162)

This invention relates to an adjustable pitch propeller for fluid-propelled vehicles, the construction of which is particularly adaptable to the propulsion of aircraft. It can be advantageously used in connection with boats, submarines, fans, blowers or the like.

The principal object of this invention is to provide a propeller construction capable of self-adjustment of the pitch of its blade or blades in accordance with the action of the thrust forces on the blade, this being particularly advantageous in that the pitch of the blade is automatically controlled and adjusted to provide substantially maximum thrust under all operating conditions.

Another important object of this invention is to provide a propeller which, by the action of the thrust forces, is capable of changing its pitch to increase the efficiency thereof irrespective of the speed of the engine, the centrifugal force, aerodynamic drag of the blade or otherwise.

A further object of this invention is to provide a propeller with any number of blades including the single blade type so arranged and constructed that the propeller pitch is obtained automatically, not requiring the usual operation devices and the services of the operator.

Other objects and advantages of the invention will be apparent upon further study of the accompanying specification and drawings.

In the drawings:

Figure 1 is a perspective view of a propeller which embodies my invention.

Figure 2 is a longitudinal section of the hub and balanced-end of the single blade propeller as shown along the lines 2—2 of Figure 1.

Figure 3 is a cross-sectional view of the hub taken on line 3—3 of Figure 1, showing the blade in high pitch position.

Figure 4 is a cross-sectional view of the hub taken on line 3—3 of Figure 1, showing the blade in low pitch position.

Figure 5 is a cross-sectional view similar to Figures 3 and 4, except using a ball and socket type hub.

Figure 6 is a cross-sectional view of a hub incorporating my invention and illustrated with a propeller of the dual-blade type.

Figure 7 is a perspective view of the inner hub unit.

Figure 8 is a perspective view of the outer hub unit.

Figure 9 is a cross-sectional view similar to Figures 3 and 4 illustrating another form of my invention.

As shown:

The operation of my invention depends upon the actual thrust (T) which the propeller is capable of exerting upon the aircraft under any flight condition. This is practically an ideal feature, for "maximum thrust" is always desired for any flight condition. For example, during the take-off it is desirable that the pitch be reduced so that the engine speed may be increased to develop its rated power. This permits a short and fast take-off run. At altitude and under cruising conditions the static thrust decreases and it is desirable to increase the pitch of the blades to increase the speed of the aircraft. My invention obtains these advantageous features in a simple, accurate and inexpensive manner.

In the drawings, it will be noted that the invention is illustrated principally in connection with a single-blade type of propeller, wherein the movement of the propeller due to the thrust forces is balanced or controlled by the centrifugal forces acting upon the blade. It is recognized that this feature is old in the art, even in the construction of propellers for aircraft wherein the combined action of the thrust and centrifugal forces automatically control the pitch of the propeller blades. My invention may not only be adapted to the single-blade type but may be adapted to a multi-blade propeller as shown in Figure 6, which is a view comparable to the views of Figures 3 and 4 illustrating the single-blade propeller. It is to be understood that this invention is adaptable to any number of blades.

In the drawings, which illustrate a preferred embodiment of my invention, the numeral 10 designates the propeller as a complete unit consisting of a hub unit 11 and a blade unit 12. The hub unit 11 is preferably constructed of metal, such as aluminum or steel alloys. The blade unit 12 may be constructed of steel, aluminum alloy, wood or other compositions. The propeller 10 is adapted to be fitted to a power plant or engine 13 by means of a propeller shaft 14.

The hub unit 11 is essentially composed of a support 15 which is mounted on and rotates with the propeller shaft 14; an inner sliding sleeve 16 arranged and constructed for movement along and in the direction of the propeller shaft 14 and a resilient element 17 which is designed to resist movement of the sleeve 16. An outer sleeve 16a may be constructed between the inner sleeve 16 and the hub portion 18 of the blade unit 12. The sleeve 16 is structurally related to the blade unit 12 through its studs 19, the outer sleeve 16a and its studs 19a; this combination forming a "universal joint" action, similar to the common ball and socket type joint, in such a manner that the hub portion 18 of the blade unit 12 can pivot or change its angular relationship with the sleeve 16 as disclosed by the lines 20. This universal mounting effect will be more fully described hereinafter. The resilient element 17 is illustrated herein as being a spring element; however, it is to be understood that any resilient member may be used, no matter whether it is of a rubber composition, a shock cord, or otherwise. It is to be further understood that it may be of a tension or compression type. The support 15 must be structurally of sufficient size to carry the loads applied to it. It carries a pivot 21 which acts as an attachment between support 15 and hub portion 18 of the blade unit 12, in this way allowing the hub portion 18 and the blade unit 12 to rotate about the studs 19a (see Figure 8), which are positioned substantially ninety degrees from studs 19, to change the pitch of the blade. The pivot 21 is shown as a single link in Figure 1 and as a double link in the remaining figures. It is readily seen that the amount of pitch change is determined by the amount of the thrust force (T).

The inner sleeve 16 is fitted to the propeller shaft 14 in order to transmit the torque from the engine to the propeller. This transmission of torque may be accomplished by means of splines or as shown by the drawings by the use of a key 22. Stops 23 may be employed to limit the action of the pitch changing mechanism.

It is to be noted that the pitch or blade angle is controlled by the relative position of support 15 and pivot 21 with respect to the position of the sleeves 16 and 16a along the shaft 14. Sleeves 16 and 16a constitute a mechanical construction similar to a sliding type universal joint and as such move fore and aft along the shaft 14, as is shown in Figure 2, 3 and 4. The blade rotates about its axis on studs 19a to change pitch or blade angle. The support 15 and pivot 21 restrain the blade at a point away from studs 19a, such point being fixed so that change in pitch or blade angle can only occur when the inner hub 16 slides on shaft 14. Studs 19 provide the axis of oscillation for "coneing" as shown by lines 20, such coneing action being necessary because of the single blade construction.

According to the illustrated example disclosed by Figure 3 of the drawings, the sleeve 16 bears against a resilient member 17 which tends to restrain the blade unit 12 at high pitch position as shown by the lines 24, this being the usual position for normal flight operation. For take-off where low pitch is desired, as shown by lines 25 of Figure 4, the thrust (T) is greater, thus causing the blade unit 12 to slide forward, carrying the sleeve element 16 with it in a forward direction against the action of the resilient element 17, which results in a decreased pitch of the blades and a corresponding increase in the engine speed. In other words, when the thrust (T) is a large value as in the take-off condition, the hub portion 18 moves forward, thus reducing the pitch and allowing rated power to be developed. Conversely, when the thrust (T) is a small value as in the level flight condition, the hub portion 18 moves rearward, thus increasing the pitch, resulting in increased flight speed.

The thrust produced by a single blade propeller does not occur along the center line of the propeller shaft, thus in such a construction, provision must be made for the blade to cone or otherwise move as disclosed by the lines 20 of Figure 1. In this single blade propeller I propose to allow the thrust to pull the blade forward about an axis through studs 19 of Figure 2. It is to be realized that the centrifugal forces on the blade and on the counterweight 26 are many times greater than the thrust force and thus tend to cause the propeller to attempt to rotate in a flat plane normal to the axis of propeller rotation. Coneing may be described as being when the thrust force pulls the blade forward slightly so that the blade describes a circular path that resembles a cone whose point is at the center of the shaft and whose base is outlined by the forward tilted tip of the blade. Exact balance is obtained when the thrust force is balanced by an equal an opposite component of the diagonal resultant centrifugal forces of the blade and counterweight. It should be noted that coneing as used in my invention pertains only to the problem of balance and has no effect on the pitch or blade angle whatsoever.

In the single blade construction as illustrated the blade is counter-balanced by a weighted end member 26 and is adapted to be more accurately balanced by movable weight element 27 which can be adjusted to obtain very accurate balance. The weight 27 may be moved in and out of the threaded tube 28 in order to obtain perfect balance. The thrust force (T) on the single blade, the counterweight drag, the counterweight centrifugal force and the blade centrifugal force are so balanced that the fore and aft angular movement of the propeller about the studs 19 is restricted, a shown by the lines 20. In this manner, the thrust forces on the blade are transferred to the propeller shaft without undue rocking unbalance.

This propeller is particularly adaptable and desirable in connection with its use as a propelling element in an aircraft. The principle of operation of such a propeller as applied to an aircraft may be described or explained as follows: When the aircraft is "idling" at low speed or more particularly at low R. P. M. as when slowly taxiing along the ground, the resilient element 17 forces the hub unit 11 and blade unit 12 to the rear to a high pitch position as is shown in Figure 3. Inasmuch as the resilient element 17 is so adjusted as to provide less pressure in a rearward direction than is produced in a forward direction by the thrust of the propeller, during take-off and climb the hub unit 11 and blade unit 12 slide forward against the action of the resilient element 17 into a low pitch position as shown in Figure 4. This action permits the propeller to increase in speed and thus utilize to a greater advantage the horsepower of the engine. After sufficient altitude is gained the climbing condition is changed to level flight at a greater forward speed. Inasmuch as the thrust decreases as the forward speed of the aircraft is increased, a point is reached when the thrust becomes less than the pressure exerted by the resilient element 17 at which time the hub unit 11 and the blade unit 12 are forced rearwardly into a high pitch position. Stops 23 may be used to limit the fore and aft movement. The propeller remains in the high pitch position even under conditions of full power and maximum R. P. M. so long as the forward speed is sufficient to keep the thrust value below the pressure of the resilient element 17. During cruising conditions the propeller will remain in high pitch until and unless the propeller is returned to the climbing condition in which event the thrust becomes greater than the pressure of the resilient element 17 and the propeller automatically proceeds to low pitch. Movement from low to high pitch and vice versa may be gradual or quick depending on variations of thrust and adjusted pressures of the resilient element 17.

The embodiment of the invention as described in the specification and disclosed in the drawings is a preferred one. I do not wish to be restricted to such construction for it is recognized that other constructions may be employed to accomplish the results of this invention. For example, instead of sleeves 16, 16a and studs 19 and 19a, a ball and socket type of hub may be used. This is illustrated in Figure 5 wherein the functions of the stud means 19 and 19a are carried out in the ball and socket joint 29. This particular construction is disadvantageous in that the propeller blade loads must be transmitted to the rotary element 14 by means of a support 15. It is to be understood that the support 15 may be constructed in various manners on either side of the hub unit 11 and may form a part of a typical propeller spinner or hub cowl if so desired.

It is to be recognized that the invention is readily adaptable to multi-blade propellers as is diagrammatically shown in Figure 6; it being evident that the blade units extend in opposite directions from the cross-section as shown and that the blade units 12a and 12b, pivots 32 and 33 and supports 15 are all superimposed into one common plane in order to facilitate explanation of its operation. In this case, the blade units 12a and 12b are rotated in opposite directions as shown by the lines 30 and 31. Each of the blade units requires separate pivots such as 32 and 33. The blades rotate from high pitch to low pitch position and vice versa in a similar manner to the single blade construction as disclosed by Figures 3 and 4. It is readily seen that in the multi-blade propeller installations the blades require a construction at the hub which will permit blade pitch changes in opposite directions, with sufficient stability to withstand centrifugal forces imposed upon the blades due to rotation.

Another form of the invention may be constructed according to Figure 9. In this construction, the inner sleeve 34 has integral studs 35 which permit the propeller to rotate according to the lines 20 of Figure 2. The outer sleeve 36 has integral studs 37 which permit the propeller blades to rotate about the studs to change the pitch of the blades 12. In this construction, the resilient element 17 forms a part of the pivot 21, the hub unit 11 is non-slidable on the propeller shaft 14, and the support 15 forms an integral part of the hub unit 11. It is readily seen that this construction is somewhat the reverse of the aforementioned construction in that the sliding element and the resilient element have changed positions. It will be noted, however, that the blade 12 is still rotated in accordance with the thrust force (T), principally due to the thrust leverage 38 about the studs 37.

In summarizing the invention as disclosed by the various Figures 1 to 9 which show modifications of the invention, it may be concluded that the blade of the propeller, in all instances, is so constructed and arranged with respect to the propeller shaft that it is forced to change its pitch angle due to the fact that one of its edge portions is held against movement by associated rigid structure whereas the other edge portion is free to move in accordance with the equilibrium established by the aerodynamic thrust on the blade and the resisting action of the resilient element.

It is to be understood that the forms of my invention as illustrated and disclosed by the foregoing specification and drawings are preferred examples of the same and that various rearrangements of parts may be used without departing from the spirit and scope of my invention as determined by the following claims.

I claim:

1. In a propeller having a hub and blade adapted to be driven by a propeller shaft, an automatic pitch changing mechanism comprising an inner sleeve member coaxial and rotatable with said propeller shaft, a blade adjustment means mounted in said hub comprising an outer sleeve member pivoted to said inner sleeve member, said outer sleeve member being pivotally connected to said hub, stop means to limit the movement of said inner sleeve member, a support member carried by and rotatable with said propeller shaft, said support member having pivot means connecting said support member with said blade to permit said blade to rotate about said pivot means, and resilient means to control longitudinal motion of said sleeve with respect to said shaft whereby the blade pitch varies in respect to the thrust forces on said blade.

2. In a propeller, a propeller shaft, a hub and blade adapted to be driven by said propeller shaft, a pitch changing mechanism comprising an inner sleeve member surrounding and driven by said shaft and arranged to slide thereon, an outer sleeve member pivotally connected to said inner sleeve member and to said hub, said inner and outer sleeve members being so constructed and arranged to permit movement of said blade in both pitch changing and vertical attitude, a support member carried by and rotatable with said propeller shaft, said support member having pivot means connecting said support member with said hub to permit said hub to rotate about said pivot means whereby the pitch of the propeller is changed in response to the thrust forces on said blade.

3. In a propeller, a propeller shaft, a hub and a single blade adapted to be driven by said propeller shaft, said single blade being static balanced and having adjustment means to provide therefor, an inner sleeve member surrounding said shaft and arranged to slide thereon, a means for revolving said inner sleeve with said shaft, stop means to limit movement of the inner sleeve member, an outer sleeve member pivotally connected to said inner sleeve member and to said hub, a support member carried by and rotatable with said propeller shaft, said support member having pivot means connecting said support member with said hub to permit said hub to rotate about said pivot means whereby the pitch of the propeller is changed in response to the thrust force on said blade.

4. In a propeller, a propeller shaft, a hub and blade adapted to be driven by said propeller shaft, an inner sleeve member surrounding and driven by said shaft, an outer sleeve member pivotally connected to said inner sleeve member and to said hub, a support member rotatable with said propeller shaft, said support member having pivot means connecting said support member with said hub, and resilient means mounted between said support member and said hub to permit said hub to rotate and change the pitch of the propeller in response to the thrust force on said blade.

5. In a variable-pitch propeller, a hub and blade element to be driven by a propeller shaft, a blade adjustment mechanism mounted in said hub comprising an inner sleeve member drivably connected to said propeller shaft and arranged to slide thereon and an outer sleeve member pivotally connected to said inner sleeve member, said outer sleeve member being connected with said hub and blade element, a support member carried by and rotatable with said propeller shaft, said support member having a pivot means connecting said support member to said blade and hub, and a resilient means for controlling the longitudinal movement of said blade adjustment mechanism whereby the pitch of said propeller may be changed in response to the thrust force on said blade.

6. In a variable pitch propeller, a blade having a hub to which it is secured in fixed angular relation with respect to the hub, a shaft for driving said blade, a sleeve encircling said shaft, which is driven by said shaft and which is axially movable relatively thereto, said sleeve being encompassed by said hub, means pivotally connecting said sleeve and said hub so that said blade may turn about its longitudinal axis, an arm which turns with said shaft and which has one end fixed against movement axially of said shaft, the other end of said arm being pivotally connected to said hub, and resilient means for resisting movement of said sleeve along said shaft in response to thrust forces acting on said blade, whereby to vary automatically the pitch of said blade in response to changes in such thrust.

7. In a variable pitch propeller, a blade having a hub to which it is secured in fixed angular relation with respect to the hub, a shaft for driving said blade, a sleeve encircling said shaft, which is driven by said shaft and which is axially movable relatively thereto, said sleeve being encompassed by said hub, means pivotally connecting said sleeve and said hub so that said blade may turn about its longitudinal axis, an arm which turns with said shaft and which has one end fixed against movement axially of said shaft, the other end of said arm being pivotally connected to said hub so that at said last mentioned end said hub may turn about an axis which is substantially parallel to the longitudinal axis of said blade, and resilient means for resisting movement of said sleeve along said shaft in response to thrust forces acting on said blade, whereby to vary automatically the pitch of said blade in response to changes in such thrust.

8. In a variable pitch propeller, a blade having a hub to which it is secured in fixed angular relation with respect to the hub, a shaft for driving said blade, a sleeve encircling said shaft, which is driven by said shaft and which is axial-ly movable relatively thereto, said sleeve being encompassed by said hub, means for pivotally connecting said sleeve and said hub so that said blade may turn about its longitudinal axis, an arm which turns with said shaft and which has at least a portion thereof extending generally in the same direction as said shaft, one end of said arm being fixed against movement axially of said shaft and the other end being pivotally connected to said hub, and resilient means for resisting movement of said sleeve along said shaft in response to thrust forces acting on said blade, whereby to vary automatically the pitch of said blade in response to changes in such thrust.

9. In a variable pitch propeller, a blade having a hub to which it is secured in fixed angular relation with respect to the hub, a shaft for driving said blade, a sleeve encircling said shaft, which is driven by said shaft and which is axially movable relatively thereto, said sleeve being encompassed by said hub, means including said sleeve for universally connecting said hub to said shaft, an arm which turns with said shaft and which has one end fixed against movement axially of said shaft, the other end of said arm being pivotally connected to said hub, and resilient means for resisting movement of said sleeve along said shaft in response to thrust forces acting on said blade, whereby to vary automatically the pitch of said blade in response to changes in such thrust.

WALTER H. KORFF.

REFERENCES CITED

The following references are of record in the file of this patent:

UNITED STATES PATENTS

| Number | Name | Date |
| --- | --- | --- |
| 1,757,292 | Caldwell | May 6, 1930 |
| 2,008,865 | Havill et al. | July 23, 1935 |
| 2,124,369 | Everts | July 19, 1938 |
| 216,244 | Ward | June 3, 1879 |
| 1,876,634 | De Sautels | Sept. 13, 1932 |
| 2,160,745 | Levy | May 30, 1939 |

FOREIGN PATENTS

| Number | Country | Date |
| --- | --- | --- |
| 311,472 | Great Britain | May 16, 1929 |
| 828,442 | France | Feb. 14, 1938 |
| 21,067 | Great Britain | Sept. 9, 1910 |
| 410,828 | France | May 31, 1910 |
| 462,037 | Great Britain | Mar. 1, 1937 |
| 798,926 | France | May 29, 1936 |
| 131,419 | Great Britain | Aug. 14, 1919 |
| 476,596 | Great Britain | Dec. 13, 1937 |